United States Patent
Alrutz et al.

(10) Patent No.: US 6,935,040 B2
(45) Date of Patent: Aug. 30, 2005

(54) CABLE INSTALLATION SYSTEM AND RELATED METHODS

(75) Inventors: Mark E. Alrutz, Hickory, NC (US); Christopher P. Gemme, Hickory, NC (US); Mark O. Vogel, Statesville, NC (US); Martin B. Lee, Denver, NC (US)

(73) Assignee: Commscope Properties, LLC, Sparks, NV (US)

( * ) Notice: Subject to any disclaimer, the term of this patent is extended or adjusted under 35 U.S.C. 154(b) by 76 days.

(21) Appl. No.: 10/641,220

(22) Filed: Aug. 14, 2003

(65) Prior Publication Data

US 2004/0232271 A1 Nov. 25, 2004

Related U.S. Application Data

(63) Continuation-in-part of application No. 10/440,995, filed on May 19, 2003.

(51) Int. Cl.[7] ............................. B25D 5/00; G01B 3/10
(52) U.S. Cl. ............................. 33/579; 33/759; 33/494; 33/679.1
(58) Field of Search ........................... 33/755–756, 759, 33/494, 679.1, 772–773, 732–733, 712; 242/118.4, 118.41

(56) References Cited

U.S. PATENT DOCUMENTS

| | | |
|---|---|---|
| 1,982,304 A | 11/1934 | Holden |
| 2,602,233 A | 7/1952 | Irving |
| 2,817,906 A * | 12/1957 | Hall ............................. 33/772 |
| 2,930,584 A | 3/1960 | Hensley et al. |
| 3,648,835 A * | 3/1972 | Yucel ............................. 33/755 |
| 3,693,228 A * | 9/1972 | Logan ........................... 29/56.6 |
| 3,793,732 A | 2/1974 | Hamrick ....................... 33/137 |
| 3,835,543 A | 9/1974 | Polydoris et al. ............. 33/141 |
| 4,367,852 A * | 1/1983 | Lazaro, Jr. ............. 242/129.72 |
| 4,508,317 A | 4/1985 | Conti ....................... 254/134.3 |
| 4,541,586 A * | 9/1985 | Crowe ...................... 242/129.5 |
| 4,744,653 A | 5/1988 | Sano et al. ..................... 356/5 |

(Continued)

FOREIGN PATENT DOCUMENTS

| | | | |
|---|---|---|---|
| DE | DT2557488 | 6/1997 | ............ H02B/1/20 |
| DE | 10104062 | 8/2002 | ............ H02G/1/08 |
| GB | 1073170 | 6/1997 | |

OTHER PUBLICATIONS

Pacific Laser Systems PLS–1; "PLS1 Professional Distance Measuring Tool", Jun. 17, 2003, pp. 1.

Easylaser.com; "HD360 Laser Distance Meter and Accurate and Safe Distance Measurement with Laser Technology". Jun. 17, 2003, pp. 1–2.

Yoas Sevices Inc., "Measurement Devices", Jun. 17, 2003; pp. 1–7.

*Primary Examiner*—Christopher W. Fulton
*Assistant Examiner*—Yaritza Guadalupe
(74) *Attorney, Agent, or Firm*—Allen, Dyer, Doppelt, Milbrath & Gilchrist, P.A.

(57) ABSTRACT

A cable installation system for use by a cable installer may include a plurality of cable dispensers having different lengths of cable. In particular, each cable dispenser may also have a non-numeric, length-identifying marking associated therewith corresponding to the length of cable. Furthermore, the system may also include a cable dispenser indicator device for use by the installer to determine a distance between first and second locations, such as a cable tap and a subscriber interface. The cable dispenser indicator device may also provide an indication to the installer of the non-numeric, length-identifying marking corresponding to the determined distance so that the cable installer can select the corresponding cable dispenser from the plurality thereof. By way of example, the non-numeric, length-identifying markings may include a series of different colors and/or graphics for respective length ranges.

23 Claims, 3 Drawing Sheets

U.S. PATENT DOCUMENTS

| | | | | |
|---|---|---|---|---|
| 4,967,484 A | | 11/1990 | Nosek | 33/781 |
| 5,010,656 A | | 4/1991 | Broselow | 33/759 |
| 5,042,613 A | * | 8/1991 | Hermann | 33/756 |
| 5,286,972 A | | 2/1994 | Falk et al. | 250/231 |
| 5,329,467 A | | 7/1994 | Nagamune et al. | 364/561 |
| 6,012,228 A | | 1/2000 | Fisanich | 33/289 |
| 6,249,987 B1 | * | 6/2001 | Gorfu | 33/781 |
| 6,655,991 B2 | * | 12/2003 | Heebe et al. | 439/578 |
| 6,684,522 B2 | * | 2/2004 | Chilton | 33/494 |
| 6,774,788 B1 | * | 8/2004 | Balfe | 340/539.13 |
| 2001/0034158 A1 | * | 10/2001 | Matsubara | 439/578 |
| 2002/0133965 A1 | | 9/2002 | Gilber | 33/756 |
| 2003/0184300 A1 | * | 10/2003 | Bigelow | 324/326 |

* cited by examiner

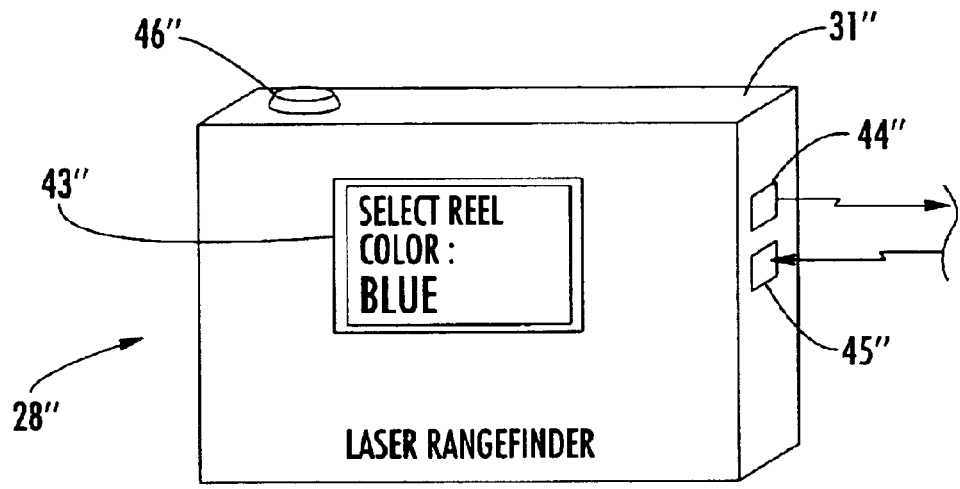
FIG. 4
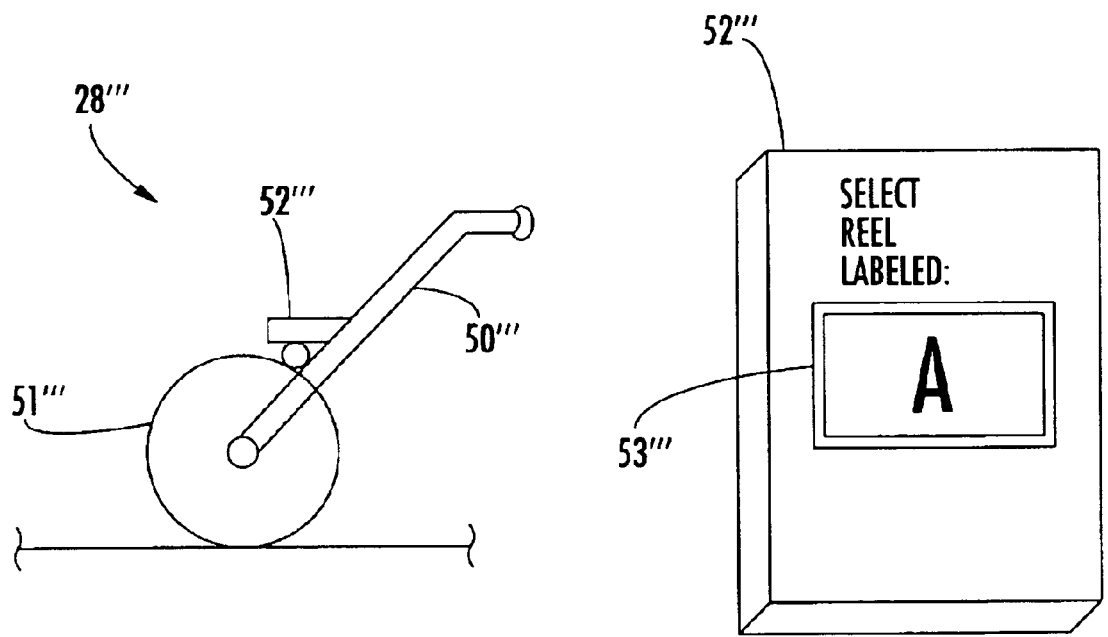
FIG. 5
FIG. 6

CABLE INSTALLATION SYSTEM AND RELATED METHODS

CROSS-REFERENCE TO RELATED APPLICATIONS

This application is a continuation-in-part of co-pending U.S. patent application Ser. No. 10/440,995, filed May 19, 2003, which is hereby incorporated herein in its entirety by reference.

FIELD OF THE INVENTION

The present invention relates to the field of cable installation, and, more particularly, to systems for use by cable installers to facilitate the installation process and related methods.

BACKGROUND OF THE INVENTION

When a user first subscribes to a cable television or phone service, for example, a service provider typically is required to install a cable from a tap to a subscriber interface at the subscriber's house, building, etc. The cable is used to transmit signals between the tap point, which provides access to the service provider's communications network, and the subscriber interface, which is connected to the wires running through the house or building. The type of cable to be installed generally depends upon the particular application, but examples of such cables may include fiber-optic cable, coaxial cable, and telephone cables, as well as others.

During such an installation, a cable installer typically estimates the distance from the tap to the subscriber interface, and the estimated amount of cable is paid off a storage reel. Unfortunately, if a cable installer is in a hurry or fairly inexperienced, this can result in excessive cable waste, since installers are more likely to overestimate the amount of cable needed. Because such cable can be costly, wasting several feet or even tens of feet of cable per installation may thus result in a significant expense to a service provider over numerous installations.

Various prior art attempts have been made to address the problem of cable waste in certain very specific applications. For example, U.S. Pat. No. 2,930,584 to Hensley et al. discloses a device including a self-propelled projectile for installing a pulling line within a conduit. The housing carries a counter so that a number of revolutions indicates the length of the conduit. Similarly, U.S. Pat. No. 3,793,732 to Hamrick discloses a similar apparatus for installing heavy electrical conductors in conduits. Rather than a counter, a tape is instead connected to the projectile and has measuring indicia (i.e., one foot markings) thereon. Once the distance is known, the appropriate length of electrical conductor can be ordered and thereafter installed.

Yet another example of a conduit measuring device is disclosed in U.S. patent publication no. 2002/0133965 to Gilber. In particular, Gilber discloses a handheld device for dispensing a fish tape into a conduit. Markings (i.e., one foot markings) are provided on the fish tape to indicate the length of the conduit.

Despite the advantages provided by the above systems, their use is limited to the installation of cable within a conduit. Yet, such conduits are typically not available for use in outdoor cable television or phone line installations. Moreover, if the numerical markings included on such measuring devices are not printed sufficiently large, or a cable installer is in a hurry, the installer may still end up with the wrong length of cable despite using such a device.

SUMMARY OF THE INVENTION

In view of the foregoing background, it is therefore an object of the present invention to provide a cable installation system and related methods which facilitate the installation process and reduce cable waste.

This and other objects, features, and advantages in accordance with the present invention are provided by a cable installation system for use by a cable installer which may include a plurality of cable dispensers having different lengths of cable. In particular, each cable dispenser may also have a non-numeric, length-identifying marking associated therewith corresponding to the length of cable. Furthermore, the system may also include a cable dispenser indicator device for use by the installer to determine a distance between first and second locations, such as a cable tap and a subscriber interface. The cable dispenser indicator device may also provide an indication to the installer of the non-numeric, length-identifying marking corresponding to the determined distance so that the cable installer can select the corresponding cable dispenser from the plurality thereof.

By way of example, the non-numeric, length-identifying markings may include a series of different colors for respective length ranges. Thus, for example, as the cable dispenser indicator device determines the distance between the first and second locations, it may provide the appropriate color from among the series of colors which corresponds to the dispenser having the appropriate length of cable thereon to span the determined distance. Similarly, the markings may include a series of different graphics for respective length ranges.

Accordingly, the system of the present invention significantly simplifies the process of selecting the appropriate cable length by reducing the "guesswork" the installer will have to exercise. That is, the installer may carry the various cable dispensers in his truck and, based upon the indication (i.e., color, symbol, etc.) provided by the cable dispenser indicator device, simply select the appropriate dispenser having the indicated marking thereon. Not only may this lead to a reduction in wasted cable, but it may also save the installer time in the installation process.

More particularly, one exemplary cable dispenser indicator device may include a portable housing and an elongate member carried by the housing and having a series of non-numeric, length-identifying markings thereon. Another exemplary cable dispenser indicator device may also include a handle, a wheel rotatably carried by the handle, and a counter connected to the wheel. The counter may be for converting revolutions thereof into a series of non-numeric, length-identifying markings. Still another cable dispenser indicator may include a portable housing, a wireless rangefinder carried by the housing, and an indicator connected to the wireless rangefinder for converting signals therefrom into a series of non-numeric, length-identifying markings.

To further facilitate the installation process, each length of cable may have at least one respective connector connected to an end thereof. That is, the installer may bring dispensers with pre-connectorized cables to an installation site so he is not required to cut and/or splice cables and install connectors on site. This may further reduce the amount of time required for installation and thus reduce costs to the service provider since more installations can be performed without hiring more installers.

In addition, the system of the present invention may advantageously be used for outdoor as well as indoor installations. Moreover, numerous types of cables may be used. By way of example, the cables may be coaxial cables, fiber-optic cables, and/or cables with an electrical conductor(s) therein (e.g., phone lines), etc. Exemplary dispensers may include cable reels, boxes, coils, etc.

A cable installation method aspect of the invention may include providing a plurality of cable dispensers having different lengths of cable, where each cable dispenser also has a non-numeric, length-identifying marking associated therewith corresponding to the length of cable. The method may further include using a cable dispenser indicator device to determine a distance between first and second locations. The cable dispenser indicator device may also be used to provide an indication of the non-numeric, length-identifying marking corresponding to the determined distance for selecting the corresponding cable dispenser from the plurality thereof.

BRIEF DESCRIPTION OF THE DRAWINGS

FIG. 4 is a perspective view of another alternate embodiment of the cable dispenser indicator device of the cable installation system of FIG. 1.

FIG. 5 is a side view of still another alternate embodiment of the cable dispenser indicator device of the cable installation system of FIG. 1.

FIG. 6 is a top view of the display of the cable dispenser indicator device of FIG. 5.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Prime and multiple prime notation are used to indicate similar elements in alternate embodiments.

Figure 1:
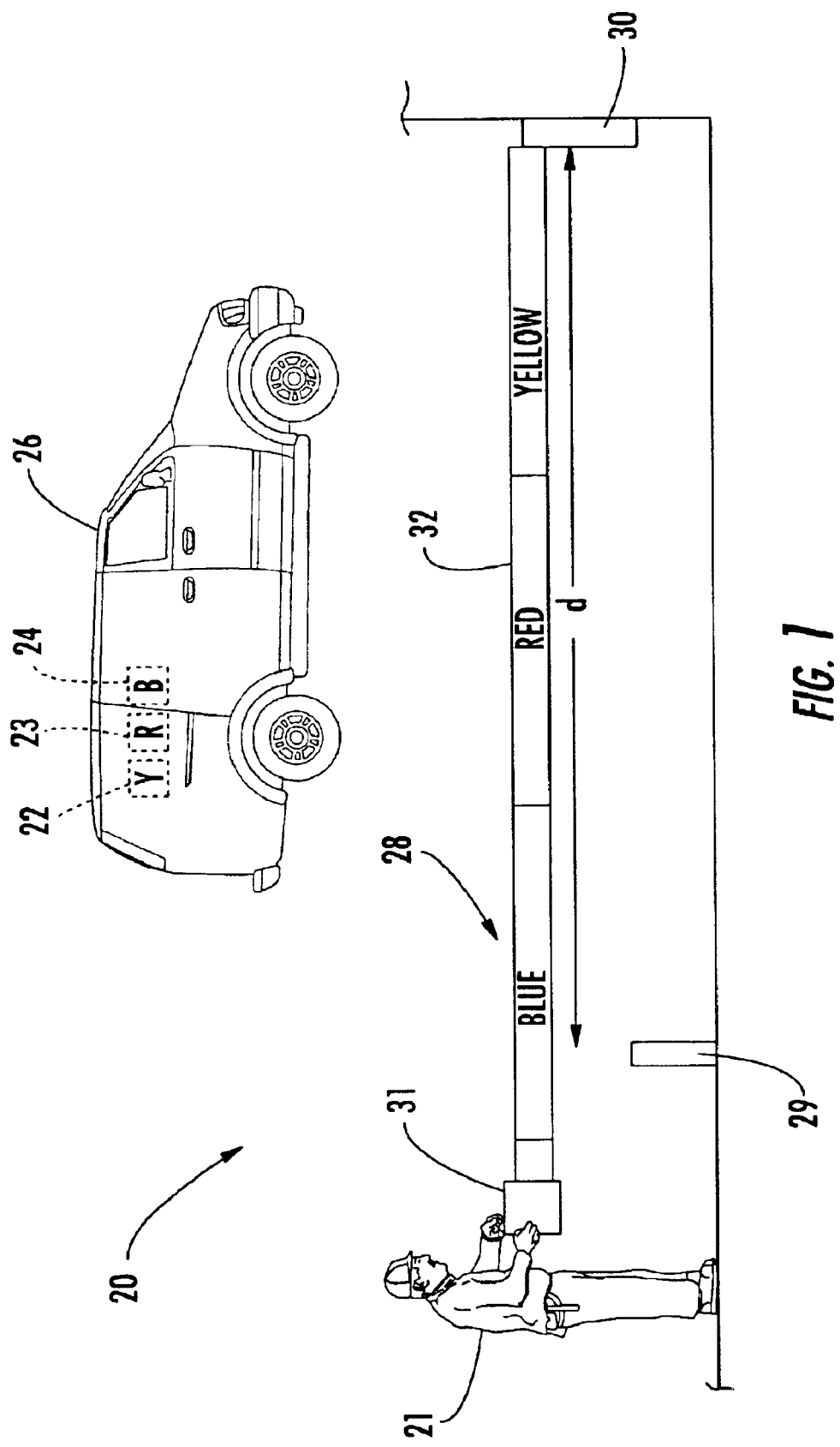
FIG. 1 is a schematic diagram of a cable installation system in accordance with the present invention.
Figure 2:
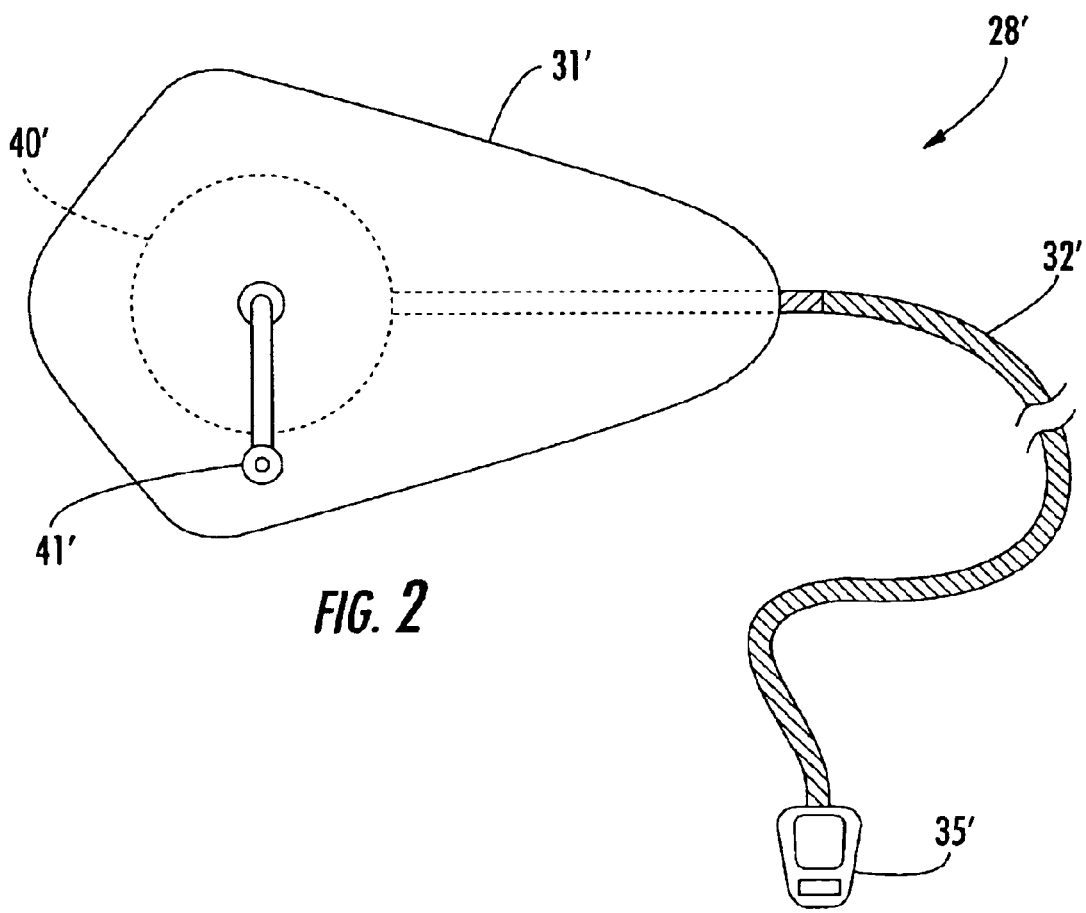
FIG. 2 is a side view of an alternate embodiment of the cable dispenser indicator device of the cable installation system of FIG. 1.
Figure 3:
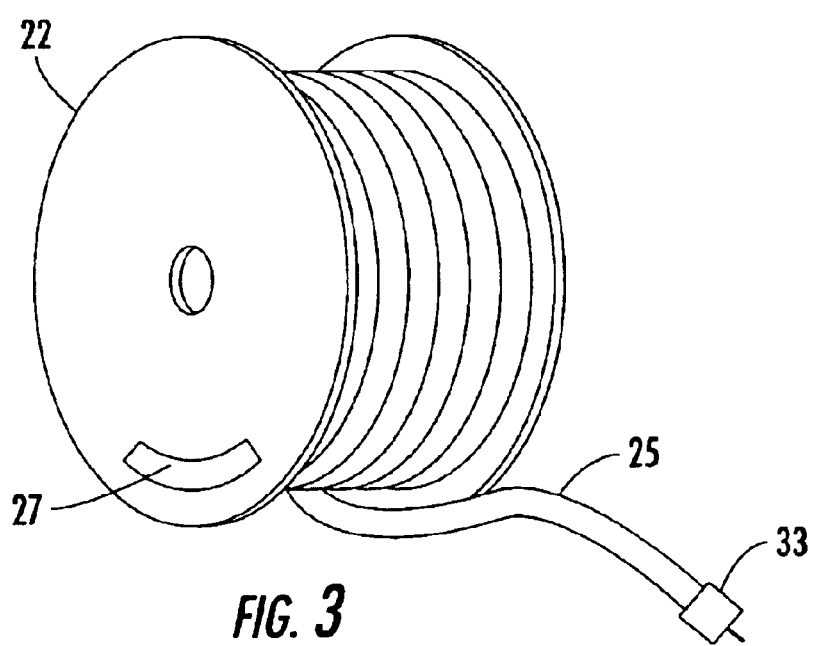
FIG. 3 is a perspective view of a cable dispenser for use with the cable installation system of FIG. 1.

Referring initially to FIGS. 1 through 3, a cable installation system 20 for use by a cable installer 21 illustratively includes a plurality of cable dispensers 22–24 each having different lengths of cable 25 thereon. The dispensers 22–24 would typically be loaded onto a work truck/van 26 by the installer 21 before coming to an installation site, for example. In accordance with the invention, each cable dispenser 22–24 has a non-numeric, length-identifying marking associated therewith corresponding to the length of cable thereon.

By way of example, the dispensers may be cable reels, as illustratively shown in FIG. 3, although other suitable dispensers such as boxes, wrappers, coils, etc., may also be used. The non-numeric markings may be colors (FIG. 3) and/or graphics or alphabetic characters (FIG. 6), for example. Of course, other suitable non-numeric indicia or markings may also be used, as will be appreciated by those skilled in the art.

In the illustrated example, the dispenser 22 has the color yellow associated therewith to indicate a first length of cable thereon, the dispenser 23 has red associated therewith to indicate a second length of cable longer than the first, and the dispenser 24 has blue associated therewith to indicate a third length of cable longer than the first two. This could be done using a yellow label 27 on the reel 22, as illustratively shown, or by simply using a yellow reel. Of course, other suitable marking methods may also be used.

In accordance with the invention, the system 20 further illustratively includes a cable dispenser indicator device 28 for use by the installer 21 to determine a distance d between first and second locations, such as a cable tap 29 and a subscriber interface 30. The cable dispenser indicator device 28 provides an indication to the installer 21 of the non-numeric, length-identifying marking corresponding to the determined distance d so that the cable installer can select the corresponding cable dispenser from the plurality 22–24 thereof.

More particularly, the indicator device 28 illustratively includes a housing 31 and an elongate member 32 carried by the housing and having a series of non-numeric, length-identifying markings thereon. Here, the markings are a series of colored zones or ranges (i.e., a yellow range, a red range, a blue range, etc.), each of which represents a respective cable dispenser 22–24 that should be used. Thus, in the present example, the installer 21 should select the blue dispenser 24 for the installation, as the cable on the blue dispenser will provide the minimum cable length that will span the distance d. Of course, in some embodiments, extra length may be added to the cables so the installer 21 does not have to compensate for end slack, for example.

To further facilitate the installation process, each length of cable may have at least one respective connector 33 connected to an end thereof. In the illustrated example, each length of cable may thus have a first connector 33 appropriate for connection with the cable tap 29 at one end, and a second connector at the other end for connection with the subscriber interface 30. As such, the installer 21 is advantageously not required to cut and/or splice cables and install connectors in the field. This may further reduce the amount of time required for installation, and thus reduce costs to the service provider since more installations can be performed without increasing the number of installers.

By way of arbitrary example, the cable lengths may be in 25 ft. increments. Thus, the yellow dispenser 22 has 25 ft. of cable thereon, the red dispenser 23 has 50 ft., and the blue dispenser 24 has 75 ft. Of course, numerous cable lengths and/or increments may be used in accordance with the present invention.

In the illustrated embodiment of FIG. 1, the portable housing 31 generally resembles that of a tape measure, and the elongate member 32 a retractable tape. In another embodiment of the indicator device 28', the housing 31' generally resembles that of a chalk line housing, and the elongate member 32' resembles a string having different color zones, as illustrated in FIG. 2. More particularly, the housing 31' illustratively includes a reel 40' for the string 32' and a handle 41' connected to the reel for reeling up the string. The string 32' may also have a tab 35' on the end thereof which allows the installer 21 to secure the end of the string at a first location while paying out the string to measure the distance to a second location, as will be appreciated by those skilled in the art.

Another embodiment of the cable dispenser indicator device 28" illustrated in FIG. 4 includes a portable housing 31''', a wireless rangefinder carried by the housing, and an indicator or display 43'' connected to the wireless rangefinder. In the illustrated example, the wireless rangefinder is a laser range finder including a laser light emitter 44'' for directing laser light at a target and a collector 45'' for collecting reflected laser light therefrom. This may be done responsive to the installer 21 pressing a button 46'' on the housing 31'', for example. The display 43'' may be an LED or LCD display, for example, although other suitable displays may also be used.

The laser rangefinder 28'' will also include components within the housing for converting the reflected light into electrical signals and determining the distance to the target based thereon, which are not shown for clarity of illustration. However, such components will be readily appreciated by those skilled in the art and require no further discussion herein. Of course, it should also be noted that the wireless rangefinder could also use radio frequency signals (e.g., radar), or other suitable wireless measurement techniques, as will also be appreciated by those skilled in the art.

Yet another exemplary cable dispenser indicator device 28''' is illustratively shown in FIGS. 5 and 6. The cable dispenser indicator device 28''' illustratively includes a handle 50''', a wheel 51''' rotatably carried by the handle, and a counter 52''' connected to the wheel. In particular, the counter 52''' converts revolutions of the wheel 51''' into a series of non-numeric, length-identifying markings, as discussed above. By way of example, the counter 52''' may include a display 53''' for displaying an alphabetic character, as shown, or other graphic, symbol, etc.

It will therefore be appreciated that the system 20 of the present invention significantly simplifies the process of selecting the appropriate cable length by the installer 21 by reducing the guesswork the installer will have to exercise. That is, the installer may carry the various cable dispensers in his truck, and based upon the indication (i.e., color, symbol, etc.) provided by the cable dispenser indicator device, simply select the appropriate dispenser having the indicated marking thereon. Not only may this lead to a reduction in wasted cable, but it may also save the installer time in the installation process.

It will further be appreciated by those of skill in the art that the system 20 of the present invention may advantageously be used for outdoor as well as indoor installations. Additionally, numerous types of cables may be used in accordance with the present invention. By way of example, the cables may be coaxial cables, fiber-optic cables, cables with an electrical conductor(s) therein (e.g., phone cables), etc. Examples of suitable dispensers includes cable reels, boxes, coils, etc.

A cable installation method aspect of the invention includes providing a plurality of cable dispensers 22–24 having different lengths of cable, where each cable dispenser also has a non-numeric, length-identifying marking associated therewith corresponding to the length of cable, as discussed above. The method further includes using a cable dispenser indicator device 28 to determine a distance d between first and second locations. The cable dispenser indicator device 28 is also used to provide an indication of the non-numeric, length-identifying marking corresponding to the determined distance d for selecting the corresponding cable dispenser from the plurality 22–24 thereof, as previously discussed above.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A cable installation system for use by a cable installer, the system comprising:

a plurality of portable cable dispensers to be transported by the cable installer to a cable installation site extending between first and second cable installation locations, said plurality of portable cable dispensers having different lengths of cable, each cable dispenser also having a non-numeric, length-identifying visual marking associated therewith corresponding to the length of cable; and a cable dispenser indicator device for use by the installer at the cable installation site to determine a distance between the first and second cable installation locations, and to provide an indication to the installer of the non-numeric, length-identifying visual marking corresponding to the determined distance so that the cable installer can select the corresponding cable dispenser from the plurality thereof.

2. The cable installation system of claim 1 wherein said cable dispenser indicator device comprises:

a housing; and an elongate member carried by said housing and having a series of non-numeric, length-identifying visual markings thereon.

3. The cable installation system of claim 1 wherein said cable dispenser indicator device comprises:

a handle;

a wheel rotatably carried by said handle; and a counter connected to said wheel for converting revolutions thereof into a series of non-numeric, length-identifying visual markings.

4. The cable installation system of claim 1 wherein said cable dispenser indicator device comprises:

a housing;

a wireless rangefinder carried by said housing; and an indicator connected to said wireless rangefinder for converting signals therefrom into a series of non-numeric, length-identifying visual markings.

5. The cable installation system of claim 1 wherein each length of cable has at least one respective connector connected to an end thereof.

6. The cable installation system of claim 1 wherein the non-numeric, length-identifying visual markings comprise a series of different colors for respective length ranges.

7. The cable installation system of claim 1 wherein the non-numeric, length-identifying visual markings comprise a series of different graphics for respective length ranges.

8. The cable installation system of claim 1 wherein said lengths of cable are for outdoor use.

9. The cable installation system of claim 1 wherein said lengths of cable are for indoor use.

10. The cable installation system of claim 1 wherein each length of cable comprises at least one of a coaxial cable, a fiber-optic cable, and an electrical conductor.

11. The cable installation system of claim 1 wherein said dispensers each comprise at least one of a reel, a box, and a coil.

12. A cable installation system for use by a cable installer, the system comprising;

a plurality of portable cable dispensers to be transported by the cable installer to a cable installation site extending between first and second cable installation locations, said plurality of portable cable dispensers having different lengths of cable with at least one respective connector connected to an end thereof, each cable dispenser also having a respective color associated therewith corresponding to the length of cable; and a cable dispenser indicator device for use by the installer at the cable installation site to determine a distance between the first and second cable installation locations, and to provide a color marking to the installer corresponding to the determined distance from among a series of different color markings for respective length ranges so that the cable installer can select the corresponding cable dispenser from the plurality thereof.

13. The cable installation system of claim 12 wherein said cable dispenser indicator device comprises:

a housing; and an elongate member carried by said housing and having the series of different color markings thereon.

14. The cable installation system of claim 12 wherein said cable dispenser indicator device comprises:

a handle;

a wheel rotatably carried by said handle; and a counter connected to said wheel for converting revolutions thereof into the series of different color markings.

15. The cable installation system of claim 12 wherein said cable dispenser indicator device comprises:

a housing;

a wireless rangefinder carried by said housing; and an indicator connected to said wireless rangefinder for converting signals therefrom into the series of different color markings.

16. A cable installation method comprising:

providing a plurality of portable cable dispensers to be transported by the cable installer to a cable installation site extending between first and second cable installation locations, the plurality of portable cable dispensers having different lengths of cable, each cable dispenser also having a non-numeric, length-identifying visual marking associated therewith corresponding to the length of cable; and using a cable dispenser indicator device at the cable installation site to determine a distance between the first and second cable installation locations, and to provide an indication of the non-numeric, length-identifying visual marking corresponding to the determined distance for selecting the corresponding cable dispenser from the plurality thereof.

17. The method of claim 16 wherein the cable dispenser indicator device comprises:

a housing; and an elongate member carried by the housing and having a series of non-numeric, length-identifying visual markings thereon.

18. The method of claim 16 wherein the cable dispenser indicator device comprises:

a handle;

a wheel rotatably carried by the handle; and a counter connected to the wheel for converting revolutions thereof into a series of non-numeric, length-identifying visual markings.

19. The method of claim 16 wherein the cable dispenser indicator device comprises:

a housing;

a wireless rangefinder carried by the housing; and an indicator connected to the wireless rangefinder for converting signals therefrom into a series of non-numeric, length-identifying visual markings.

20. The method of claim 16 wherein each length of cable has at least one respective connector connected to an end thereof.

21. The method of claim 16 wherein the non-numeric, length-identifying visual markings comprise a series of different colors for respective length ranges.

22. The method of claim 16 wherein the non-numeric, length-identifying visual markings comprise a series of different graphics for respective length ranges.

23. The method of claim 16 wherein using comprises using the cable dispenser indicator device to determine the distance between a cable tap and a cable subscriber interface.

* * * * *